(12) United States Patent
Gesser et al.

(10) Patent No.: US 8,011,853 B2
(45) Date of Patent: *Sep. 6, 2011

(54) FLUID AND NUTRIENT DELIVERY IRRIGATION SYSTEM AND ASSOCIATED METHODS

(75) Inventors: Hyman D. Gesser, Winnipeg (CA); Donald R. T. LaFreniere, Sarasota, FL (US); Edmund A. Sinda, Bradenton, FL (US)

(73) Assignee: Developmental Technologies, LLC, Bradenton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/830,806

(22) Filed: Jul. 6, 2010

(65) Prior Publication Data

US 2010/0329786 A1   Dec. 30, 2010

Related U.S. Application Data

(63) Continuation of application No. 12/820,621, filed on Jun. 22, 2010, and a continuation-in-part of application No. 11/930,304, filed on Oct. 31, 2007, now Pat. No. 7,748,930.

(51) Int. Cl.
*A01G 25/06* (2006.01)
*A01G 27/02* (2006.01)

(52) U.S. Cl. ............... 405/43; 405/45; 405/39; 47/48.5; 47/80

(58) Field of Classification Search ............ 405/36, 405/37, 39, 40, 43, 44, 45; 47/48.5, 62 R, 47/62 C, 80
See application file for complete search history.

(56) References Cited

U.S. PATENT DOCUMENTS

| 3,069,807 A | 12/1962 | Wall |
| 3,888,197 A | 6/1975 | Seith et al. |
| 3,939,875 A | 2/1976 | Osborn et al. |

(Continued)

FOREIGN PATENT DOCUMENTS

WO   01/01758   1/2001

(Continued)

OTHER PUBLICATIONS

Lefsrud, et al., "A Porous Tube Nutrient Delivery System Display for the Edmonton Space and Science Center," An ASAE Meeting Presentation, Paper No. 024073, 6 pages, Jul. 2002.

(Continued)

*Primary Examiner* — Frederick L Lagman
(74) *Attorney, Agent, or Firm* — Jacqueline E. Hartt; GrayRobinson, P.A.

(57) ABSTRACT

A system and method for efficiently delivering an aqueous solution to plants includes a hydrophilic solution-channeling device having a delivery portion positionable adjacent a root system of a plant. The solution-channeling device has a lumen therethrough for channeling a solution from an inlet to the delivery portion. At least a portion of the delivery portion has a porosity adapted for permitting a flow of the solution therethrough when acted upon by at least one of a surfactant root exudate and negative root pressure generated by the plant roots, for example, when experiencing water stress and/or a need for nutrients. The system also includes a pressure regulating device for providing at least a minimum pressure value to permit fluid to flow through the lumen and at most a maximum pressure value above which fluid flows through the lumen even in the absence of surfactant root exudate or negative root pressure.

34 Claims, 5 Drawing Sheets

U.S. PATENT DOCUMENTS

| | | | |
|---|---|---|---|
| 4,142,325 | A | 3/1979 | Greenbaum |
| 4,180,348 | A | 12/1979 | Taylor |
| 4,185,414 | A | 1/1980 | Miller |
| 4,207,705 | A | 6/1980 | Errede et al. |
| 4,268,993 | A | 5/1981 | Cunningham |
| 4,356,665 | A | 11/1982 | De Oliveira |
| 4,447,983 | A | 5/1984 | Shinada |
| 4,740,104 | A | 4/1988 | Stöhr et al. |
| 4,747,540 | A | 5/1988 | Meyer |
| 4,916,858 | A | 4/1990 | Hobson |
| 4,993,186 | A | 2/1991 | Immonen |
| 5,099,609 | A | 3/1992 | Yamauchi |
| 5,315,787 | A | 5/1994 | Schleicher et al. |
| 5,481,826 | A | 1/1996 | Dickinson et al. |
| 5,622,004 | A | 4/1997 | Gidge |
| RE35,857 | E | 7/1998 | Mehoudar |
| 5,865,377 | A | 2/1999 | DeFrank et al. |
| 5,921,025 | A | 7/1999 | Smith |
| 5,938,372 | A | 8/1999 | Lichfield |
| 5,956,899 | A | 9/1999 | DiOrio |
| 6,015,102 | A | 1/2000 | Daigle et al. |
| 6,079,156 | A | 6/2000 | Colovic |
| 6,182,394 | B1 | 2/2001 | Bassler |
| 6,205,706 | B1 | 3/2001 | Buss |
| 6,226,920 | B1 | 5/2001 | Myers |
| 6,226,921 | B1 | 5/2001 | Kang |
| 6,250,571 | B1 | 6/2001 | Cohen |
| 6,302,338 | B1 | 10/2001 | Cohen |
| 6,308,902 | B1 | 10/2001 | Huntley |
| 6,343,749 | B1 | 2/2002 | Thom |
| 6,357,179 | B1 | 3/2002 | Buss |
| 6,370,820 | B1 | 4/2002 | Moss |
| 6,371,390 | B1 | 4/2002 | Cohen |
| 6,403,012 | B1 | 6/2002 | Tomohiro et al. |
| 6,460,786 | B1 | 10/2002 | Roberts |
| 6,464,816 | B1 | 10/2002 | DeFrank et al. |
| 6,484,439 | B1 | 11/2002 | Tonkin et al. |
| 6,561,443 | B2 | 5/2003 | Delmer |
| 6,766,817 | B2 | 7/2004 | da Silva |
| 6,793,824 | B2 | 9/2004 | Tonkin et al. |
| 6,918,404 | B2 | 7/2005 | Dias da Silva |
| 7,066,586 | B2 | 6/2006 | da Silva |
| 7,166,224 | B2 | 1/2007 | Tonkin et al. |
| 7,198,431 | B2 | 4/2007 | Gesser |
| 7,222,454 | B1 | 5/2007 | Chen |
| 7,712,253 | B2 * | 5/2010 | Gesser et al. .................. 405/43 |
| 7,748,930 | B2 * | 7/2010 | Gesser et al. .................. 405/43 |
| 2002/0116870 | A1 | 8/2002 | Chen |
| 2004/0115000 | A1 | 6/2004 | Fu |
| 2005/0133613 | A1 | 6/2005 | Mayer et al. |
| 2005/0135880 | A1 | 6/2005 | Stark |

FOREIGN PATENT DOCUMENTS

| | | |
|---|---|---|
| WO | 03/055294 | 7/2003 |

OTHER PUBLICATIONS

Microirrigation for a Changing World: Conserving Resources/Preserving the Environment, Proceedings of the Fifth International Microirrigation Congress, 6 pages, Apr. 1995.

Errede, L.A., "Effect of Organic Anion Adsorption on Water Permeability of Microporous Membranes," Journal of Colloid and Interface Science, vol. 100, No. 2, pp. 414-422, Aug. 1984.

Errede, L.A., "Effect of Molecular Adsorption on Water Permeability of Microporous Membranes," Journal of Membrane Science, vol. 20, pp. 45-61, 1984.

Errede, Louis and Martinucci, Patricia, "Flow Rate of Water through Porous Membranes as Affected by Surface Modification on the Low-Pressure Side of the Membrane," I&EC Product Research & Development, vol. 19, No. 4, pp. 573-580, Dec. 1980.

Errede, L.A., "Plant Influence on Water Flow Through Artificial Membranes," Annals of Botany, vol. 52, pp. 23-29, 1983.

Errede, L.A., "Correlation of Water Uptake and Root Exudation," Annals of Botany, vol. 52, pp. 373-380, 1983.

Errede, L.A., "Studies of Water Uptake from Multiple Sources," Annals of Botany, vol. 52, pp. 839-847, 1983.

Norikane et al., "Determining the Extractable Water Limit for Wheat in a Substrate-Based Media Designed for Space Flight Applications," Applied Engineering in Agriculture, vol. 19, No. 5, pp. 565-569, 2003.

Lefsrud et al., "Development of the Microgravity Plant Growth Pocket," Transactions of the ASAE, vol. 46, No. 6, pp. 1647-1651, 2003.

Solomon, Kenneth H. and Jorgensen, Greg, "Subsurface Drip Irrigation," Research Report, CATI Publication #930405, [online], [retrieved on Oct. 20, 2005], Retrieved from the Center for Irrigation Technology website using Internet <URL:http://cati.csufresno.edu/cit/rese/93/930405>, 1993.

Cooney et al., "A Research Study of the Feasibility of Implementing a Living Wall into the Environmental Studies 2 Building," Research Report, pp. 1-39, 2004.

* cited by examiner

POLYHYDROXY-STYRENE

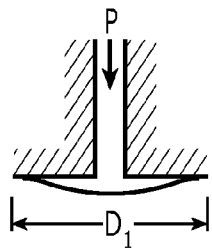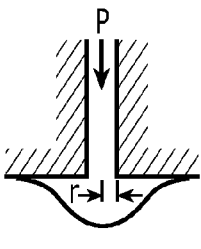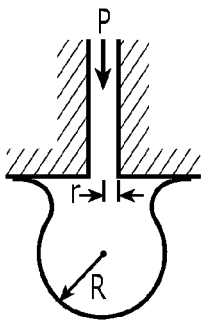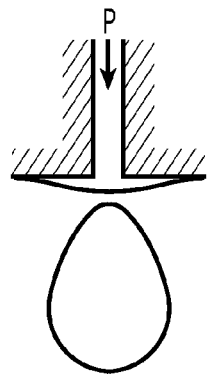
FIG. 8A (PRIOR ART)  FIG. 8B (PRIOR ART)  FIG. 8C (PRIOR ART)  FIG. 8D (PRIOR ART)
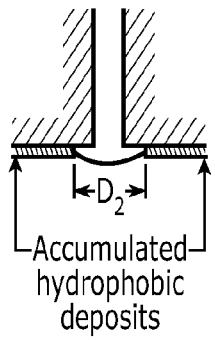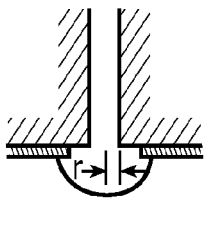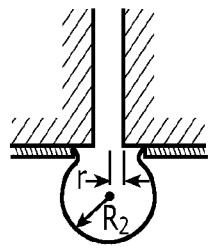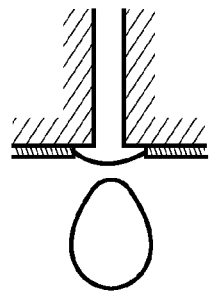
FIG. 8E (PRIOR ART)  FIG. 8F (PRIOR ART)  FIG. 8G (PRIOR ART)  FIG. 8H (PRIOR ART)
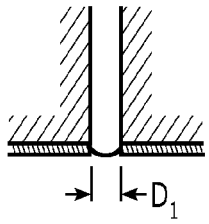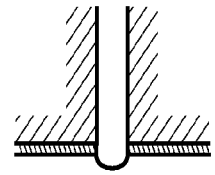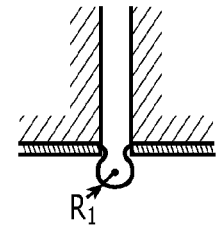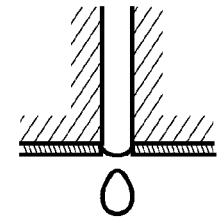
FIG. 8I (PRIOR ART)  FIG. 8J (PRIOR ART)  FIG. 8K (PRIOR ART)  FIG. 8L (PRIOR ART)

FLUID AND NUTRIENT DELIVERY IRRIGATION SYSTEM AND ASSOCIATED METHODS

CROSS-REFERENCE TO RELATED APPLICATIONS

This application is a continuation-in-part of Ser. No. 11/930,304, filed Oct. 31, 2007, now U.S. Pat. No. 7,748,930, and of Ser. No. 12/820,621, filed Jun. 22, 2010, which itself is a continuation of patent application Ser. No. 11/930,304, filed Oct. 31, 2007, now U.S. Pat. No. 7,748,930, which itself is a continuation-in-part of patent application Ser. No. 11/677,642, filed Feb. 22, 2007, now U.S. Pat. No. 7,712,253, which itself is a continuation-in-part of patent application Ser. No. 11/126,073, filed on May 10, 2005, now U.S. Pat. No. 7,198,431, which itself claims priority to provisional application Ser. No. 60/569,262, filed on May 10, 2004, the disclosures of all of which are incorporated by reference hereinto.

FIELD OF INVENTION

The present invention generally relates to systems and methods for watering and supplying nutrients to plants, and, in particular, to such systems and methods for minimizing water use and maximizing potential crop density by delivering water and nutrients "on demand."

BACKGROUND

The need for a self-watering system for plants is well established, since agriculture utilizes approximately 70% of the world's fresh water resources, and many products have been designed and built to satisfy this need to varying degrees. Some systems supply a small continuous amount of water, often referred to as drip irrigation or trickle irrigation, supplying water to the root zone irrespective of the plants' needs. Other systems rely on the moisture level in the soil to signal the need for water. Still others use wicks that bring water to the plant as a result of surface tension and the capillary rise effect.

Drip irrigation or trickle irrigation is a well established method of growing crops in arid areas. It is claimed to be 90% efficient in water usage compared to 75-85% for sprinkler systems. The basic drip irrigation system generally consists of a surface tube from which small dripper tubes/emitters are fitted to take water from the supply tube to the roots of the plant on either side of the supply tube. The dripper tube/emitter limits the flow of water to the roots drop by drop based on the viscous resistance to water flow within the emitter/dripper tube. The drip rate is determined by the calculated needs of the specific plants, the soil conditions, anticipated rainfall, and evapotranspiration rate, and can vary from 1 to 4 L/hr per plant.

The need to estimate the water requirements of the crops or the amount of nutrients to be supplied in the water is seldom exact and invariably leads to wastage of water. It was shown that the roots of plants can control the release of water that is stored behind a thin porous hydrophilic membrane that is believed to become hydrophobic due to the adsorption of organic impurities in the water. The mechanism is not fully understood, though it has been speculated that among the root exudates is a surfactant that opens the pores of the membrane that became hydrophobic due the adsorbed organic impurities in water. The hydrophobic membrane inhibits the flow of water to the plants. However, the roots of the plants exude a variety of chemicals that include a surfactant that open the pores of the membrane by making it hydrophilic. Thus water can now flow to the roots and the membrane becomes hydrophobic when the plant has had enough water.

It has also been shown that when two reservoirs (one with water and the other containing nutrient solution) with membranes are presented to a plant, the plant can distinguish between the two sources, taking as much water as it needs and as much nutrients as it requires. The ratio of water to nutrient can vary from 2-5 to 1 depending on the concentration of the nutrient solution.

Several sub surface systems have been developed that include tubes that are porous or are perforated to permit the continuous slow release of water. However, these hydrophobic tubes, which require a water pressure of up to two atmospheres, do not automatically stop the delivery of water when the plants have had enough or, for example, when it rains.

One possible reason for the absence of a commercial irrigation system using the membrane system may be the difficulty of obtaining a membrane that can supply the necessary amount of water for new plants or seedlings as well as a fully grown and mature plant that is sprouting and producing fruit and produce. Another possible reason may be the reliance on constant trace amounts of organic solutes in the water, which become adsorbed on the exit walls of the hydrophilic pore channels of the membrane, converting the membrane into a hydrophobic system, which then stops or greatly reduces the flow of water through the membrane. Another reason may be the difficulty of obtaining hydrophilic tubes of suitable wall thickness and diameter that are sufficiently durable to make the process economical.

The Russian SVET space plant growth system consists of a box greenhouse with 1000 $cm^2$ growing area with room for plants up to 40 cm tall. The roots were grown on a natural porous zeolite, with highly purified water keeping the roots at the required moisture level. Zero-gravity growth chambers used by NASA have included a microporous ceramic or stainless steel tube through which water with nutrient is supplied to irrigate the greenhouse plants. Systems using porous ceramic, stainless, or hydrophobic membranes to deliver water and/or nutrients to plants are basically a form of drip irrigation where the water/nutrients are always delivered whether the plants need it or not. As will be apparent to one of skill in the art, the ceramic or stainless tubes are thicker and the organic components are adsorbed onto the full length of the channels and cannot be removed by the plant's exudates.

FIG. 7 shows the flow of water and nutrient solution for a single plant. FIG. 7, in particular, is a daily record of water flow (in mL/day) through 12 $cm^2$ of microporous Amerace A-10 fitted to the bottom of two 285-mL identically sized and shaped reservoirs (No. 1 for water and No. 2 for nutrient solution) that were embedded in the potting soil of a well-established *Ficus indica* (insert), showing the effect on the pattern of water flow when (I) root contact with the membrane was established, and (ii) when the total flow ceased to be greater than the rate of water uptake (after day 24). In general, the flow of water is about three times larger than from nutrient solution. It has been shown that a change in the concentration of the nutrient alters the ratio of flow from the two reservoirs. In FIG. 7, the exudates from the plant's roots convert step 3 back to step 1 in FIG. 8. This has been shown in an experiment by allowing a membrane to close after a specified volume of water was passed through an Amerace-10 membrane. The exit side of the membrane was then washed with alcohol and the water flow through the membrane resumed and eventually stopped when all the alcohol was washed away and the organic impurities were allowed to be adsorbed onto the exit wall of the pores shown in FIG. 8.

Again referring to FIG. 8, in step 1, as water leaves the pore of the membrane, it spreads out onto the membrane's surface, which is hydrophilic. A large drop forms and leaves the surface. As the surface becomes coated by the adsorbed hydrophobic impurities in water, the water leaving the capillary pore of the membrane cannot spread out over the surface and a smaller drop can be formed (step 2). When further coating continues, there is no room for the water to spread out onto the surface and a greater force is required to push the water through the hydrophobic area shown in step 3. The membrane is converted from the hydrophilic state to a hydrophobic state. It is made hydrophobic by the adsorption of the organic impurities in the water and/or nutrient solution. This closes the pores and prevents water from leaving the membrane under the prevailing pressure conditions. If the pressure is increased, it becomes possible for the liquid to flow again because the surface tension of water no longer can prevent the water from breaking through the pores.

SUMMARY OF THE INVENTION

The present invention is directed in one aspect to a system for efficiently delivering a solution to a plant. The system comprises a hydrophilic solution-channeling device having a delivery portion positionable adjacent a root system of a plant. The solution-channeling device has a lumen therethrough for channeling a solution from an inlet to the delivery portion. At least a portion of the delivery portion has a porosity adapted for permitting a flow of the solution therethrough when acted upon by at least one of a surfactant root exudate and negative root pressure generated by the plant roots, for example, when experiencing water stress and/or a need for nutrients.

The system also comprises a pressure regulating device for providing at least a minimum pressure value to permit fluid to flow through the lumen and at most a maximum pressure value above which fluid flows through the lumen even in the absence of surfactant root exudate or negative root pressure.

The present invention is also directed in another aspect to a method for efficiently delivering a solution to a plant. This aspect of the method comprises positioning a delivery portion of solution-channeling device adjacent a root system of a plant as described in the system above. The solution is introduced into the lumen, and the solution is channeled to the delivery portion. In a particular embodiment, a pressure of the solution is regulated upstream of an inlet into the lumen.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWING

FIGS. 8A-8L (prior art; collectively referred to as FIG. 8) are schematic representations of water flow through a microcapillary pathway of a microporous membrane as a function of the extent of hydrophilic area that surrounds the microcapillary outlet, and show how the organic impurities in water are more likely to stick at the exit end of a capillary. In step 1 (FIGS. 8A-8D) is shown the initial hydrophilic state of the area that surrounds the microcapillary outlet. $D_1$ is the diameter of the hydrophilic area, and $R_1$ is the radius of the drop emerging from the outlet, which is much greater than r, the radius of the microcapillary outlet. Step 2 (FIGS. 8E-8H) occurs after some accumulation of hydrophobic solutes at the outer perimeter of the hydrophilic area that rings the microcapillary outlet. Here $D_1 > D_2 > 2r$, and $R > R_2$. Step 3 (FIGS. 8I-8L) is the ultimate end state when the diameter $D_f$ of the hydrophilic area that surrounds the outlet shrinks to twice the radius r of the outlet. Water flow at a given outlet stops when $\Delta P = 2\gamma/R_f$ becomes greater than $P_f$, the applied pressure, where γ is the surface tension of the water. (From L. A. Errede, *J. Colloid Interface Sci.* 100, 414-22, 1984.)

DETAILED DESCRIPTION OF PREFERRED EMBODIMENTS

Figure 1A:
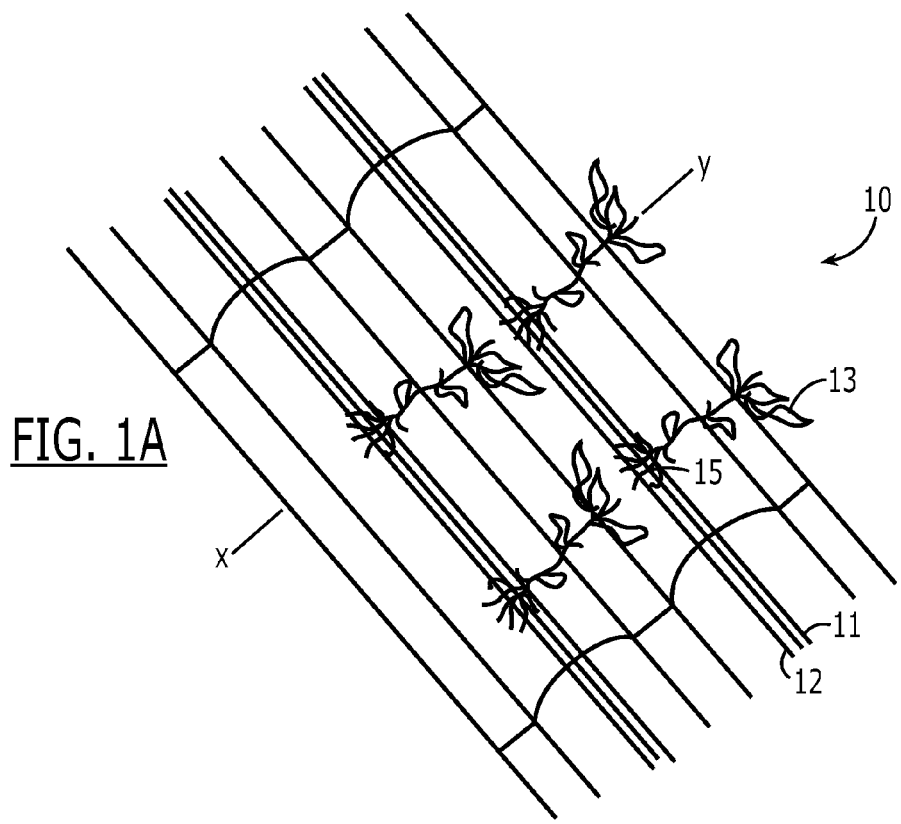
FIGS. 1A and 1B illustrate a dual irrigation tube for supplying water and nutrient to plant roots, in top plan view and cross-sectional view, respectively.

A description of the preferred embodiments of the present invention will now be presented with reference to FIGS. 1-10.

As used herein, the words "tubes" or "tubing" refer to supply lines for providing water and/or nutrients. As will be appreciated by one of skill in the art, such "tubes," "tubing," or "pipe" do not necessarily need to be cylindrical, but may be of any suitable shape, and no limitation is intended by the use of these words, which can also more broadly be described as "solution-channeling devices."

Described herein are a system and method of supplying water and/or nutrients to the roots of growing plants wherein the water and/or nutrients are released to the plants as needed by the individual plants. Herein the term "plants" should be construed broadly, and can include, for example, grasses. Although not intended as a limitation on the invention, it is believed that when under water stress, plant roots can emit exudates or surfactants that promote the release of water and/or nutrients stored under the conditions described below. Specifically, the plants are supplied water and/or nutrients from supply lines or feeder tubes, at least portions of which are hydrophilic.

In some embodiments, the tubing may include a plurality of holes that are covered by hydrophilic membranes; in other embodiments, the entire tubing, the below surface portion thereof, or a significant portion thereof is hydrophilic. In yet other embodiments, the system may include a surface tube that is water impermeable or hydrophobic, the tube being connected to a plurality of hydrophilic tubes that can be inserted into a support medium for supplying the roots.

One or more hydrophilic tubes may be inserted into a quantity of support medium such that the tubes are at least partially below the surface of the support media. The support media may be selected from any suitable medium or mixture of media suitable for supporting growing plants and roots. Examples, which are not intended as limitations, of such support media can include sand, soil, Rockwool, polyurethane foam, Fleximat™, SRI cellulose-based growth media, and the like. Other suitable media known in the art, such as continuous-fiber growth media, may also be used.

In particular embodiments, plants are planted in the support medium and the respective tubes are connected to reservoirs containing water, nutrients, or a mixture thereof. In some embodiments, two tubes may feed a row of plants: a water tube and a nutrient tube. As discussed above, it has previously been shown that the plants are capable of distinguishing between these tubes. Alternatively, nutrient(s) can be added to a water reservoir for distribution through a unitary tube.

Thin-walled microporous hydrophilic tubes are not known at present to be commercially available for use as irrigation tubing. In a particular embodiment, hydrophilic materials, including Cell Force™ and Flexi Sil™, may be made into hydrophilic tubes. Such tubes, while relatively easy to construct, can be fragile and difficult to use in applications requiring structural integrity.

Alternatively, some existing hydrophobic thin-walled tubes can be made hydrophilic by a process that uses a water-insoluble hydrophilic polymer (e.g., polyhydroxystyrene, U.S. Pat. No. 6,045,869, incorporated herein by reference; structure illustrated in FIG. 6) as a surface coating. Such solutions applied as a coating to and impregnated into microporous hydrophobic plastic tubing have been shown not to clog the pores and to remain hydrophilic for many years. Thus continuous tubes of a material such as Tyvek® (a microporous polyethylene material made from very fine, high-density polyethylene fibers, DuPont, Richmond, Va.) in a radius of 5-10 mm (Irrigro International Irrigation Systems) have been used after being made hydrophilic and have been shown to act as a membrane that is responsive to the roots of plants in a subsurface irrigation system.

Tyvek® is available in a plurality of styles, each having different properties. Although not intended to be limiting, two particular types have been found to be most beneficial for use in the present invention: 1059B and 1073B.

Alternative means of forming a solution-channeling device can comprise, for example, joining lateral ends of a sheet comprising a hydrophilic material to form a tube having a lumen therethrough; introducing an alcohol solution of a hydrophilic polymer to a microporous hydrophobic sheet and joining lateral ends of the sheet to form a tube; making a tube hydrophilic, the tube having a lumen therethrough and comprising a microporous polyethylene material comprising fine, high-density polyethylene fibers; and creating a substantially planar, microporous film comprising a hydrophilic polymer and joining opposed sides of the film to form a tube having a lumen therethrough, although these methods and the devices resulting therefrom are not intended as limitations.

As discussed above, it has been shown that hydrophilic membranes can become hydrophobic over time owing to organic impurities in the water adsorbed onto the membrane. Because of the variability of the impurities in water, we have added organic substances to the water which can be adsorbed onto the exit pore walls, making the membrane hydrophobic, and thereby reducing the flow of water or nutrient solution through the membrane. Examples of suitable organic substances include, but are by no means limited to, humic acid, kerosene, turpentine, pinene, paraffin, and hexadecane. In other embodiments, other suitable C8-C16 saturated hydrocarbons may be used. The amounts added ranged from 10 ppb to 10 ppm to the irrigating medium. As will be appreciated by one of skill in the art, in some embodiments, the addition of the organic substance may not be essential, depending on the quality of the water.

When growing crops in soil, the addition of nutrient on a continuous basis is not essential; however, when growing crops in sand, Fleximat™, or Rockwool, a nutrient solution, for example, any suitable nutrient solution known in the art such as those commonly used in hydroponic systems, e.g., Hoegland Solution, Peter's Solution, Miracle-Gro®, or other less dyed fertilizer such as Schultz Export may be added to the water supply or may be fed directly to the plants in a separate tube, as described above, and thus the roots of the plant can be allowed to take as much water and nutrient as required. However, for growth in artificial media the inclusion of nutrients and micronutrients is generally important.

Figure 1B:
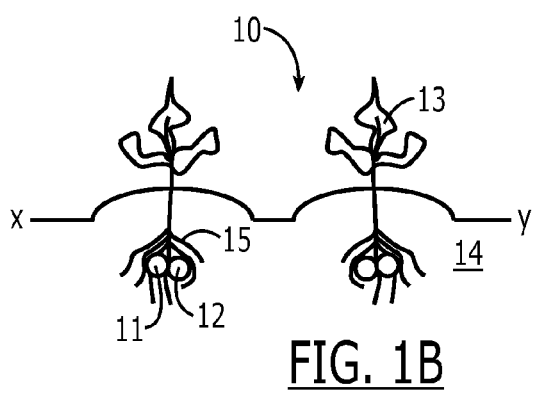

FIGS. 1A and 1B illustrate a system 10 that uses twin irrigation tubes 11,12 for delivering water and nutrient solution to plants 13 growing in a growing medium 14. In this embodiment 10, the tubes 11,12 are running through the root systems 15 of the plants 13. It has been found in experiments in both sand and potting soil that the higher the concentration of nutrients used, the smaller the volume of the nutrient solution that is released to the roots 15, which is illustrative of the water conservation achieved by the current invention.

It will be understood by one of skill in the art that the tubes 11,12 could be provided as a single composite double-lumen tube without departing from the spirit of the invention. The diameters of the two portions could be in a proportion commensurate with a plant's requirements for water versus nutrient, for example, double the size for the water tube, although this is not intended as a limitation.

Figure 1C:
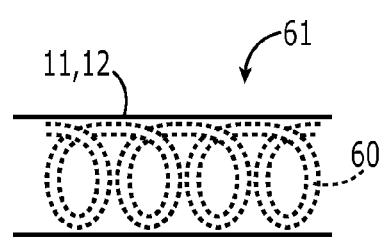
FIG. 1C is a cross-sectional view of tubing having a supporting spiral inserted thereinto.

In some embodiments, since subsurface thin-walled microporous tubing can be collapsed if sufficient pressure is applied, a spiral 60 comprising, for example, plastic, can be incorporated into a tubing such as tubing 11 or 12 to form a tube 61 that is more resistant to collapsing (FIG. 1C).

Figure 2:
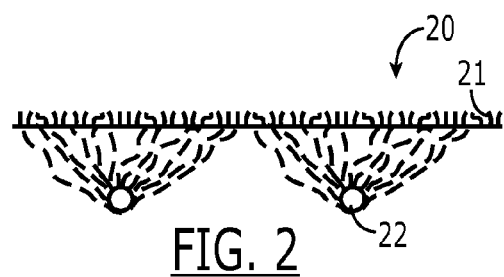
FIG. 2 is a cross-sectional view of a system for irrigating grass.
Figure 3:
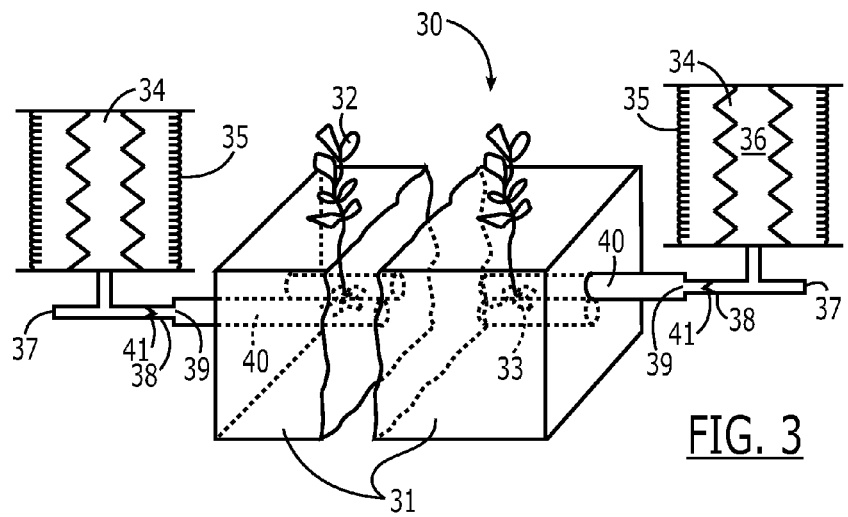
FIG. 3 illustrates an exemplary system for growing plants that is operable in a gravity-free environment.

FIG. 2 illustrates a system 20 for the irrigation of grass 21 where the subsurface tubes 22 are spaced 1-2 feet apart and are substantially continuously fed with water under low constant pressure, with nutrients added to the aqueous solution as desired.

The irrigation systems and methods described herein are believed superior to any other watering system currently in use, and further are independent of atmospheric pressure, making them usable for astroculture or micro-gravity conditions, as well as others. In one embodiment of the invention 30 (FIG. 3), for example, a continuous fiber growth medium 31 such as Rockwool or the spongy Fleximat (from Grow Tech) can be used to support the plants 32 and their roots 33. In this embodiment 30, both of the reservoirs 34 comprise a container 35 that has an interior space 36 for holding the water and nutrient solution therein. The containers 35 are formed similar to a bellows, and are movable between an expanded state when containing solution and a retracted state when solution has been removed.

The containers 35 also comprise a filling inlet 37 that is in fluid communication with the containers' interior space 36 for adding solution thereto. Distribution tubes 38 are also in fluid communication with the containers' interior spaces 36 and with inlets 39 of the hydrophilic tubes 40. This arrangement provides solution to the tubings' lumina 40. The distribution tubes 38 also have check valves 41 therein for preventing backflow of solution from the tubes 40 toward the containers' interior spaces 36.

Support for plants and their roots can be provided for in the present system under zero gravity, for example, with the use of a monolithic contiguous material such as Rockwool or Fleximat™, a spongy hydrophilic porous material made by Grow-Tech (Lisbon Falls, Me.) or the newly developed artificial sponge such as, for example, AgriLite (SRI Enviro-Grow Systems, Ontario, Canada). By using these materials to surround twin microporous hydrophilic irrigating tubes, one supplying water while the other supplying a nutrient solution, it is possible to achieve complete conservation of water and nutrients supplied to growing plants. Such a system can also be applied to arid or desert environments where water conservation is desirable.

Figure 4:
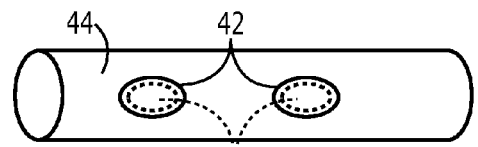
FIG. 4 is a side perspective view of an embodiment of a tube having holes covered with a hydrophilic membrane.

Early laboratory tests showed that using nutrients in water, it was possible to grow tomatoes in sand with Amerace A10 membranes 42 (50% silica gel in polyethylene) glued over holes 43 in a subsurface PVC tube 44 (FIG. 4). The holes 43 in the PVC tube 44 were 12 mm in diameter, spaced 10 cm apart, drilled in 17-mm-ID rigid PVC tubing. The holes 43 are believed to have limited the amount of water and nutrient available to the growing plant, and the system proved to be inadequate when the plants began to bear fruit and needed more membrane area to supply the plants' requirements. Increasing the total surface area of the membrane by drilling and covering more holes improved the system. However, a best mode of practicing the invention at the present time favors the use of a continuous tube. Because of the brittle nature of Amerace, membrane tubes made of this material tended to crack and leak.

Tyvek® (DuPont) in tube form has been used for irrigation purposes under elevated water pressure for gardens and row crops. However, the hydrophobic nature of the polyethylene material permits it to act as a drip source of water for plants without any control by the exudates of the plant roots. The conversion of a hydrophobic surface to hydrophilic has been described (U.S. Pat. No. 6,045,869) and can be used to make Tyvek® tubing hydrophilic and responsive to the water and/or nutrient needs of the plant. When the tubing has been made hydrophilic by coating and impregnating it with an alcohol solution of polyhydroxystyrene, the tubing was found to be permeable to water at much lower pressures, and showed a decrease in water permeability as the organic compounds in water are adsorbed onto the exit pore walls. This can be considered a "conditioning phase," during which permeability can be decreased by as much as 80% by the addition of hydrocarbons to the tap water.

The present invention is believed to be the first to provide a plurality of feeding tubes arranged to extend beneath the surface of a support medium to feed a plurality of plants or a row of plants. Furthermore, a clear advantage of tubes comprising a hydrophilic material is that a greater area of the support medium is fed water and nutrients compared to a single horizontal membrane.

The invention will now be described by way of examples; however, the invention is not intended to be limited by these examples.

Example 1

A 4 ft. length of Tyvek® tubing (#1053D) was made hydrophilic with an alcoholic solution of polyhydroxystyrene and submerged in a 4.5 ft by 13 cm wide by 10 cm deep planter, covered with soil and connected to a constant supply of nutrient solution at a constant head of 35 cm of water. Ten cherry tomato (*Lycopersicon* sp.) seedlings were planted at even distances next to the tube where water and nutrients were supplied. Fluorescent lighting was supplied to the plants for 18 hours per day. The average consumption of water was 75±10 mL/hr when the plants were 15 cm high and 125±20 mL/hr when the plants were 25 cm high. When rainfall was simulated by spraying the bed with 100 mL of water, the consumption of water dropped to zero for 2 hours and slowly over the next 3 hours returned to the normal rate. The plants grew to two feet in height, and numerous tomatoes were harvested.

At the end of the experiment, the system was examined to determine if there was any competition between the plants for space on the membrane. An examination of the root system indicated that the roots encircled the membrane only within about 1-2 inches from the plant stem. This indicates that it should be possible to increase the density of plant growth to an extent that would only be limited by the photochemical flux available and mutual interference.

When a dual-tube system was used to supply both water and nutrient separately, the ratio of water consumed to nutrient solution consumed was approximately 2.5 to 1 for 8 cherry tomato plants in sand. Again, little or no fluctuations were observed when the size of the plants reached a height of 35 cm.

Example 2

Figure 5A:
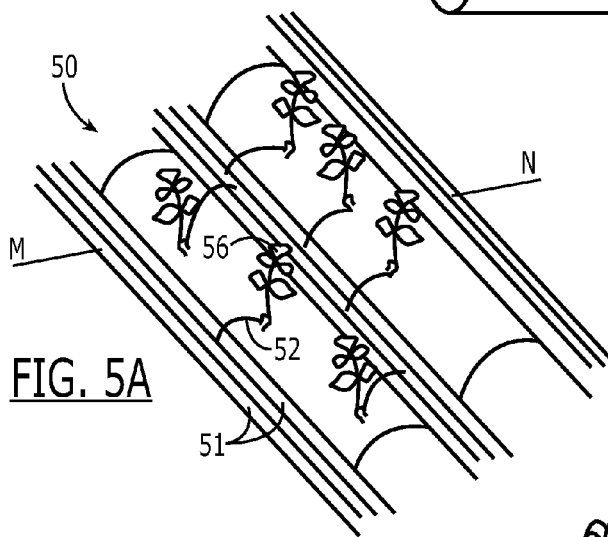
FIGS. 5A and 5B illustrate a growth system that includes both surface and subsurface portions, in top plan view and cross-sectional view, respectively.
Figure 5B:
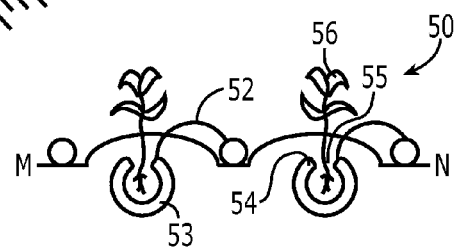
Figure 6:
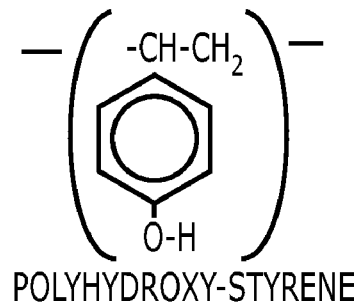
FIG. 6 is a chemical diagram of polyhydroxystyrene.
Figure 7:
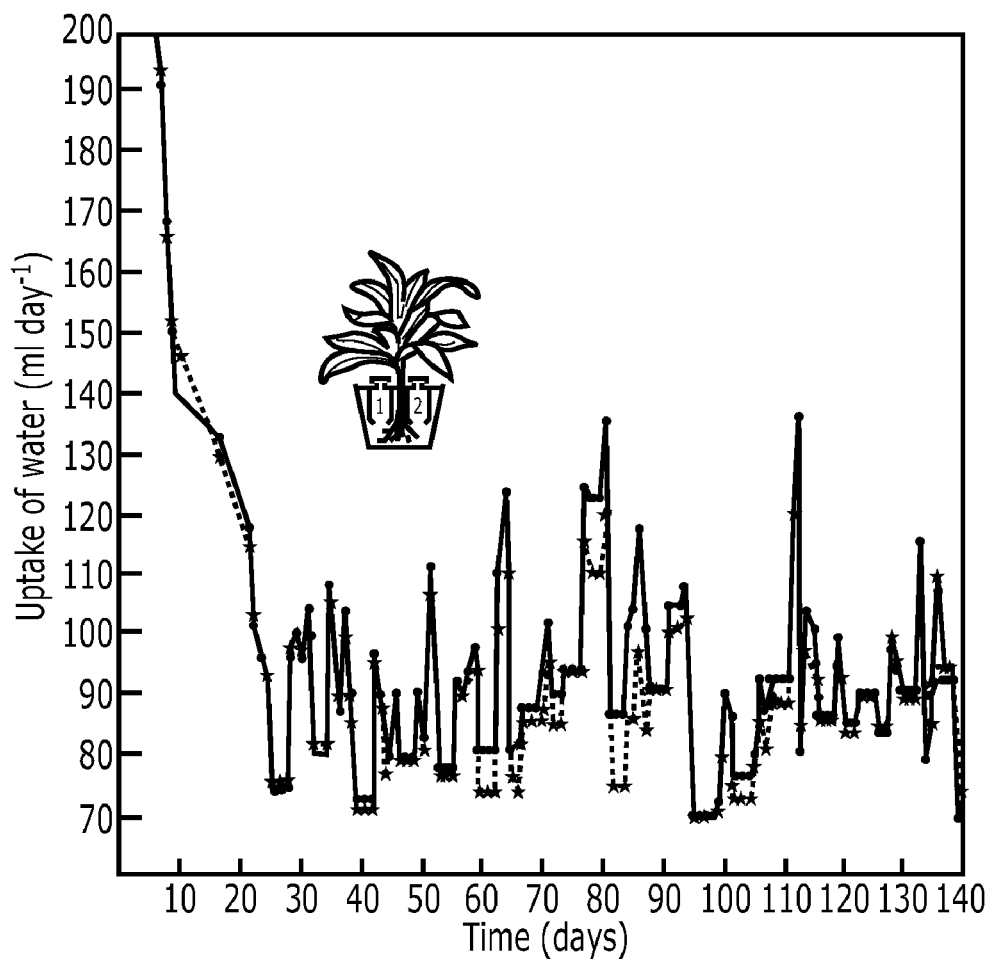
FIG. 7 (prior art) graphs the flow of water and nutrient solution for a single plant. (•), Water uptake from reservoir No. 1; (∇), nutrient uptake from reservoir No. 2. (From L. A. Errede, *Ann. Botany* 52, 22-29, 1983.)
Figure 9:
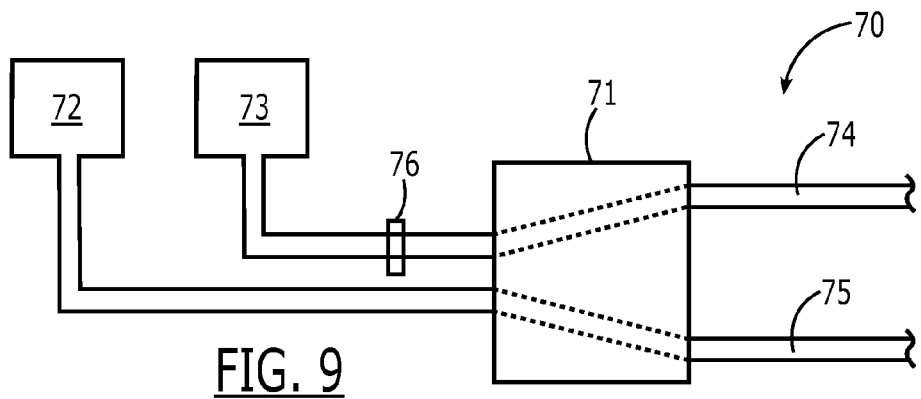
FIG. 9 is a schematic diagram of a system having a pressure regulating device incorporated thereinto.

A continuous irrigation tube can be unnecessary for plants such as grape vines or kiwi vines that are spread apart from each other by distances as much as 20 to 40 cm. In these situations 50, it is more practical to use a main flexible surface distributing tube 51 of from 20-30 mm ID, out of which are drawn satellite tubes 52 that feed a short length of from 10 to 30 cm, depending of the size of the vine, of thin-walled microporous hydrophilic irrigating tube 53, closed at its end 54, surrounding the roots 55 of the vine or bush 56, as illustrated in FIGS. 5A and 5B.

Example 3

A tomato plant was planted in potting soil, into which was also placed two 20-cm-long microporous hydrophilic tubes of 1 cm radius. The tubes were connected to reservoirs of water and nutrient which were kept full. The soil remained dry while the plant grew to produce numerous tomatoes.

Example 4

Another experiment was conducted with Tyvex® tubing (#1053B), 1.25 m long and 1 cm radius. The tubing was sealed at one end that was made hydrophilic with a 3% solution of polyhydroxystyrene (Novolac grade from TriQuest) in ethanol. The tubing was submerged in a 1.4-m planter, covered with soil, and connected to a supply of nutrient solution at a constant head of 35 cm of water. Ten cherry tomato (*Lycopersicon* sp) seedlings were planted at even distanced next to the tube, by which water and nutrients were supplied. The plants grew during the conditioning phase while exposed to fluorescence lighting for 16 hr/day. The average consumption of water was 75±10 mL/hr when the plants were 15 cm in height and 125±20 mL/hr when the plants were 25 cm in height.

Rainfall was simulated by spraying the bed with 100 mL water, following which the consumption of water dropped to zero for 2 hours and then slowly, over the next 3 hours, returned to the normal rate.

The plants grew to 60 cm in height, and an abundance of tomatoes was harvested. At the completion of the experiment, the system was examined to determine if there had been any competition between the plants for space on the membrane. An examination of the root system indicated that the roots encircled the membrane only within about 2.5-5 cm from the plant stem. This finding would seem to indicate that it should be possible to increase the density of plant growth to a level only limited by the light flux available and mutual interference.

It has also been shown that different plants requiring different rates of water and nutrient can grow together with each being satisfied individually without monitoring.

Example 5

When a dual membrane system was used to supply both water and nutrient separately, the ratio of water consumed to nutrient solution consumed was approximately 2.5 to 1 for 8 cherry tomato plants in sand. Once again, there was little or no fluctuation observed when the size of the tomato plants reached a height of 35 cm.

A planter 115 cm long, 13 cm wide, and 10 cm deep, was set up in a greenhouse with dual-feed membrane tubes for water and nutrient through the center of a bed comprising 50 cm of Flexmat and 50 cm of rockwool separated by 15 cm of polyurethane foam. The seeds or seedlings of canola (*Brassica* sp), beans (*Phaseolus* sp), corn (*Zea Mays* sp), and tomatoes (*Lycopersicon* sp) were planted in each of their respective media and their growth patterns observed. Growth, which was favored in the Fleximat, proceeded normally, except for the polyurethane foam, with each crop growing at its own rate under a light flux of 50-60 mW/cm$^2$. Root crops such as carrots (*Daucus carota* var *sativa* sp), radishes (*Raphanus sativus* sp), beets (*Beta vulgaris* sp), and onions (*Allium* sp) were grown in soil and peat, while potatoes (*Solanum tuberosum* sp), parsnips (*Pastinaca sativa* sp), and parsley (*Petroselinum sativum* var *tuberosum* sp) were grown successfully in vermiculite. A cellulose material (SRI Petrochemical Co.) can also be used as an artificial growth medium.

It was determined that grass (*Gramineae* sp) can be successfully irrigated for 3 successive years with submerged tubular membranes spaced 40-50 cm apart.

Example 6

In another case, two hydroponic planters (30×30×30 cm) were fitted with a membrane tube for a water/nutrient solution approximately 7 cm from the bottom. The media comprised a soil-less mixture approximately 25-26 cm deep in the planters. This depth allowed the root crops to produce straight tap roots, which is of concern to consumers when purchasing vegetables. One planter was seeded with parsnips (*Daucus carota* var. *sativa* sp.). The other planter was seeded with parsley (*Petroselinum sativum* var. *tuberosum* var. *tuberosum* sp.), a dual-purpose crop of foliage and root stocks. Plant competition controlled the over-seeding issue with each planter. The plants received only natural sunlight, reducing the risk of "bolting." Extreme warm temperatures were a concern for the health of the plants.

The parsnip roots were straight in growth, and produced a total weight of 38.9 g. The texture and flavor were excellent. The parsley produced straight tap roots, giving a total weight of 38.3 g. The foliage produced had longer petioles than usually purchased, yet the total weight was 58.9 g.

It will be appreciated by one of skill in the art that plants with varying water requirements can be satisfied by the embodiments of the present invention, wherein one continuous porous hydrophilic irrigating tube is used to allow each plant to take its water requirements independently of the other plants. Such requirements are often needed in greenhouses, where many different plants are cultivated under one roof.

It has also been shown that a hydrophilic irrigation tube with two channels, one for water and the other for nutrients, can fully satisfy the plants' requirements and also increase the density of the plants, limited only by the sunlight available.

It has also been shown that commercially available thin-walled microporous hydrophobic tubes can be converted to hydrophilic tubes and thereby become responsive to plants and their roots. Such tubes may include, but are not intended to be limited to, high-pressure irrigation hoses, although their use in the present invention does not require the use of high pressure.

It has also been shown how a dual-membrane tube can be incorporated into a container for one or more plants so that the plants can be fed on demand both water and nutrients from separate reservoirs and thereby require no attention or supervision as long as there is water available in the tube reservoirs. In a particular embodiment, a diametric ratio of 3:1 for the water tube over the nutrient tube is optimal, although this is not intended as a limitation, and obviously is dependent upon nutrient concentration and plant type.

It has additionally been shown that water systems that are free of contaminated organic substances and unresponsive in the irrigation system can, by the addition of trace amounts of one or more hydrocarbons to the water supply, become responsive to the irrigation system.

It has also been shown that the irrigation system of the present invention can be used to replace the emitter in a drip irrigation system, thereby making the release of water and/or nutrient responsive to the roots. In a particular embodiment, a factor of from 100 to 500 has been found for the difference in water volume used between the known drip irrigation systems and that of the present invention.

In yet another embodiment 70 (FIG. 9), a pressure regulating device, such as a float flow control valve 71 (FIG. 10), is interposed between the reservoirs 72,73 and the tubing 74,75. In addition, an inline filter 76 may be added to filter out particulate matter. In a particular embodiment, the float control 71 is operative to regulate the pressure between 1 and 3 psi, although these values are not intended as limitations. The pressure value is adjustable, for example, by setting the float flow control valve at a desired level above the tubing 74,75, for example, 28 inches for a particular tubing material and system.

Figure 10:
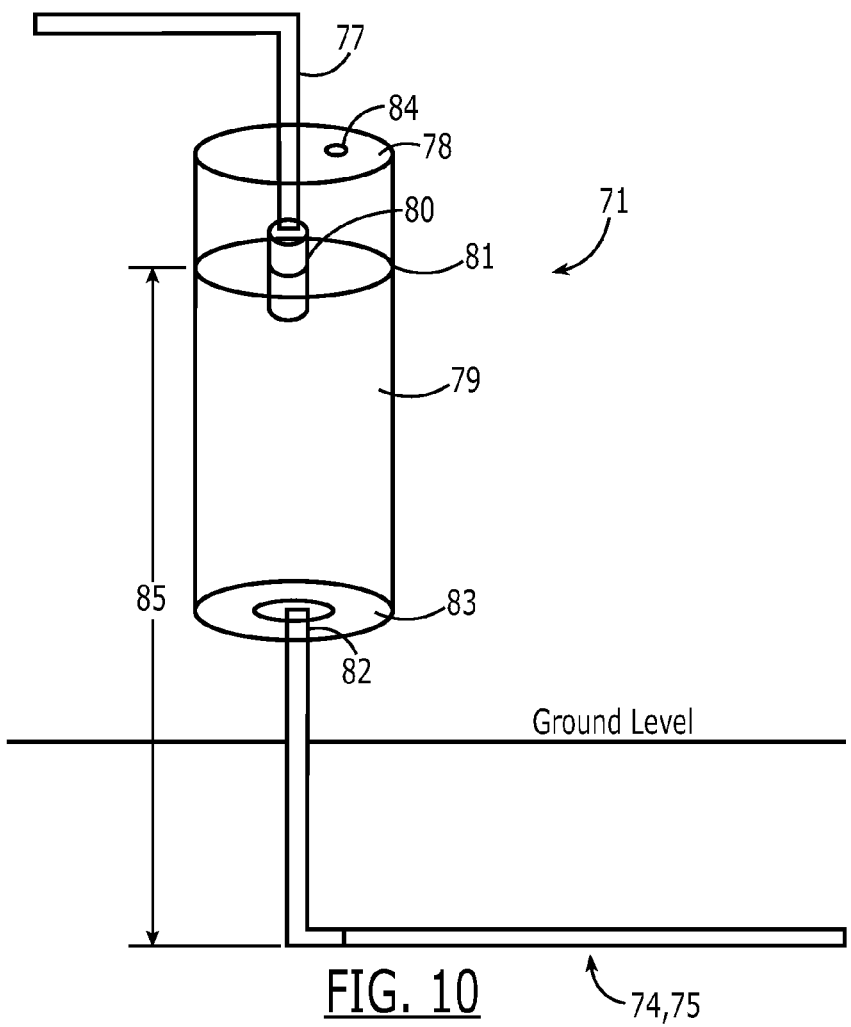
FIG. 10 is a schematic diagram of an exemplary pressure regulating device for use in the system of FIG. 9.

The exemplary float control valve 71 of FIG. 10, a water inlet 77 feeds into a top end 78 of a chamber 79 and is affixed to a float 80 that floats on a maintained water level 81. Water exits via an outlet 82 at a bottom 83 of the chamber 79, and an air vent 84 is supplied to maintain atmospheric pressure. The irrigation tube 74,75 is shown positioned beneath ground level. The height 85 above the tube's level can be adjusted, and the chamber's volume can be selected based upon desired flow rates through the system 70, for example.

It has been found that the addition of the float flow control valve 71 permits minimal operating pressures to be maintained, and that maximum pressures are not exceeded. Whether the tubing 74,75 be uniform or non-uniform, a minimum pressure is required for liquid to pass through. If too much pressure is applied, the liquid passes through the pores of the tubing 74,75 irrespective of the presence or absence of surfactant root exudate.

This system 70 permits the maintenance of pressures without the use of other, more expensive, types of pressure regulators, electronic valves, or flow regulators. The system 70 is easily concealed for landscaping applications, and yet is sufficiently robust for agricultural applications.

Sectors of grass are known to be grown substantially in isolation, for example, on golf courses wherein the greens are formed within soil-filled depressions in the ground and continuously or at predetermined intervals fed with water and nutrients. In such an arrangement, the system of the present invention can ideally provide water and nutrients to the grass roots on an on-demand basis, thereby saving both water and nutrients, and also ensuring optimal sustenance of the greens.

The following Tables 1-4 include data on experiments conducted indoors (Table 1) and outdoors (Table 2), and the flow rates for water and nutrient (Table 3) and for watering results in series and for single plants (Table 4).

TABLE 1

Indoor experimental conditions

| Plant | Growth medium | Feed | Comments |
|---|---|---|---|
| Cherry tomatoes | Soil, sand, vermiculite, peat, Rockwool, Fleximat[d] | Tap water; nutrient and water[a] | Greenhouse |
| Radishes, lettuce, carrots, tomatoes, beets, onions, spinach | Soil[b] | Dual tubes | Greenhouse |
| Parsnips, parsley, potatoes | In separate pots with vermiculite | Nutrient feed | Greenhouse in deep pots |
| Beans[c], tomatoes, canola | Rockwool and FlexiMat | Nutrient feed | In greenhouse |

[a]Two separate feed lines for water and nutrients.
[b]Beets did not mature, although the leaves were abundant.
[c]Bean roots appear to crawl all over the planter and throughout the growth media.
[d]The system was a model for the growth of plants in the International Space Station.

TABLE 2

Outdoor experimental conditions

| Plant | Growth medium | Feed | Comments |
|---|---|---|---|
| Zucchini, garlic, melons, tomatoes, eggplant, corn[a] | Soil | Water | Garden, good results |
| Grass[b] | Soil | Water | Visible improvement |
| Strawberries | Peat and FlexiMat | Vertical plant nutrient | Indoors and outdoors |

[a]Corn, melons did not take and grow.
[b]Spacing of irrigation tubes of 1. 1.5, and 2 ft (40-50 cm, 10 ft long).

TABLE 3

Test of Rockwool and FlexiMat in series for Astroculture[a]

| Test No. | Flows, side A | Flows, side B | Flow Ratio, W/N |
|---|---|---|---|
| 1 | W 19 | N 4.8 | 4.2 |
| 2 | N 20.5 | W 70.3 | 3.4 |
| 3 | W 76 | N 14 | 5.4 |
| 4 | N 25.4 | W 75.1 | 3.0 |
| 5 | W 63 | N 31 | 2.0 |
| 6 | W 66 | N 36 | 1.8 |
| 7 | N 27 | W 74 | 2.7 |

[a]Planter with two tubes, one for water (W), the other for nutrient solution (N). The reservoirs were interchanged periodically to cancel any membrane effects. Flow rates in mL/hr; experiment time March 18 to July 16.

TABLE 4

Watering results (mL/hr) for various vegetables (carrots, cherry tomatoes, onions, beets, radishes, spinach) in potted planters in two series of five (B and C) compared with single irrigated plant (X)[a]

| Test No. | Time interval (hr) | X | B | C |
|---|---|---|---|---|
| 1 | 25 | 5.4 | 32.4 | 16.2 |
| 2 | 25 | 9.7 | 41.8 | 41.7 |
| 3 | 24 | 9.4 | 39.4 | 35.6 |
| 4 | 24 | 16.9 | 21.4 | 31.9 |
| 5 | 26 | 24.2 | 23.2 | 36.3 |
| 6 | 23 | 8.6 | 48.9 | 41.9 |
| 7 | 23.5 | 5.7 | 51.7 | 38.3 |
| 8 | 3 | 21 | 30.0 | 12.0 |
| 9 | 24 | 7.5 | 33.7 | 18.9 |
| 10 | 22.5 | 26 | 56 | 30.4 |
| 11 | 20 | 12.6 | 42.3 | 42.7 |

[a]Experiment time February 19 to June 6.

Another aspect of the invention is directed to the making of tubing for use with a "water-on-demand" system. In one method, sheets of a low-porosity substance are coated with the aforementioned polyhydroxystyrene, and formed into cylinders by, for example, thermal, ultrasonic, or impulse means.

Although not intended as a limitation, a possible explanation of the operation of the polyhydroxystyrene polymer (FIG. 6) will now be presented. First, how the polyhydroxystyrene attaches to the membrane: Polyhydroxystyrene has two groups, an hydroxyl (OH), which is hydrophilic and can hydrogen bond with water, and the styrene groups, which include a benzene ring (—C6H4-) attached to an ethylene group (=CH—CH2-), both of which are hydrophobic and can stick to the hydrophobic polyethylene membrane, leaving the hydrophilic (OH) group, which forms a weak hydrogen bond with water.

As discussed above, the polymer can act as a capillary through the membrane. It has been shown that organic impurities in water are 105-106 times more likely to stick at the exit end wall of the capillaries, where there is a gas-liquid-solid equilibrium (i.e., air-water-membrane). The organic impurities are in equilibrium along the walls of the capillary, where the equilibrium is only between liquid and solid. Thus the surface of the exit pores become hydrophobic due to the adsorption of the trace organic impurities in water and/or nutrient solution.

When a plant is in need of water, it emits chemicals called exudates that can include a surfactant that removes the adhering organic compounds at the exit wall and liquid from the irrigation tube now is allowed to flow. This has been shown for two different membranes in the prior art, as discussed above with reference to FIGS. 7-8L.

High-purity water is free of organic impurities. Some domestic water supplies are often purified to such an extent that very little organic impurities remain. This would result in pore closure only after a large, and usually unnecessary, volume of water had passed through the membrane. The result would not be suitable because of the time delay between the removal of the organics and their deposition onto the membrane and the closure of the pores. On the other hand, too much organic content in the water could result in a delay in opening the closed pores because of the limited amount of surfactant that is released by the roots.

It has been found that in general the membrane area needed for a plant is best supplied by a tube of diameter equal to about a 1-cm radius, with a thickness of 0.5 mm maximum and pore sizes of from 0.1 to 5 µm, with a preferred average of 0.4 µm, although this is not intended as a limitation, and other porosity values can be used. This segment of the membrane is to be in contact with the roots of the plant. Short segments of membrane tubing can be supplied with water and/or nutrient solution by smaller diameter tubing, but care must be taken to prevent air locks in the line. Tubing of 1-cm ID would not be considered too large. Since the feed lines are exposed to light (sunlight or artificial lighting), it is necessary to use opaque tubing, or the solar active light will result in algae formation that can eventually block the pores. It is believed that the coating of the hydrophobic membrane is primarily to allow the resulting hydrophilic surface to become hydrophobic and to close the pores. Leaving the inner pore uncoated would restrict the flow of water through the membrane.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A system for efficiently delivering a solution to a plant comprising:
   a microporous solution-channeling device comprising a hydrophilic material at least at a delivery portion thereof, the solution-channeling device positionable adjacent a root system of a plant, the solution-channeling device having a lumen for channeling a solution therethrough from an inlet to the delivery portion, the solution-channeling device further having a porosity at least at the delivery portion adapted for permitting a flow of a solution therethrough when acted upon by at least one of a surfactant root exudate and negative root pressure; and
   a pressure-regulating device positionable in fluid communication at an upstream portion with a source of the solution and at a downstream portion with the inlet, for providing at least a minimum pressure value to permit solution to flow through the solution-channeling device and at most a maximum pressure value above which solution would flow through the solution-channeling device even in an absence of the at least one of the surfactant root exudate and negative root pressure.

2. The system recited in claim 1, wherein the pressure regulating device is adapted to provide a pressure value in a range of approximately 1 to 3 psi.

3. The system recited in claim 1, wherein the pressure regulating device comprises a float flow control valve.

4. The system recited in claim 1, wherein the pressure regulating device is adjustable for achieving a plurality of operating pressures.

5. The system recited in claim 1, wherein the solution-channeling device comprises a substantially planar, microporous film comprising a hydrophilic polymer formed into tubing.

6. The system recited in claim 1, wherein the solution-channeling device comprises a hydrophobic-hydrophilic polymer blend, the blend formed into tubing.

7. The system recited in claim 1, wherein the solution-channeling device comprises microporous pipe comprising a hydrophilic material.

8. The system recited in claim 1, wherein the solution-channeling device comprises a substrate having bonded thereonto a hydrophilic polymer.

9. The system recited in claim 1, wherein the solution-channeling device further comprising a compound adsorbed onto at least some pores thereof, the compound adapted for increasing a hydrophobicity of the at least some pores.

10. The system recited in claim 9, wherein the adsorbed compound comprises at least one of humic acid, kerosene, turpentine, pinene, paraffin, hexadecane, and a C8-C16 saturated hydrocarbon.

11. A method for efficiently delivering a solution to a plant comprising:
    positioning a delivery portion of microporous solution-channeling device comprising a hydrophilic material adjacent a root system of a plant, the solution-channeling device having a lumen therethrough for channeling a solution, the solution-channeling device further having a porosity at least at the delivery portion adapted for permitting a flow of an aqueous solution therethrough when acted upon by at least one of a surfactant root exudate and negative root pressure;
    regulating a pressure of the solution upstream of an inlet of the tubing;
    introducing the regulated-pressure solution into the tubing inlet; and
    channeling the solution from the tubing inlet to the delivery portion.

12. The method recited in claim 11, wherein the polymer comprises polyhydroxystyrene.

13. The method recited in claim 11, wherein the pressure regulating step comprises providing a pressure value in a range of approximately 1 to 3 psi.

14. The method recited in claim 11, wherein the pressure regulating step comprises using a float flow control valve upstream of the tubing inlet.

15. The method recited in claim 11, further comprising the step of adjusting a pressure to which the aqueous solution is regulated, for achieving a plurality of operating pressures.

16. The method recited in claim 11, further comprising channeling a compound through the solution-channeling device lumen, the compound adapted for adsorption onto at least some pores of the solution-channeling device, the compound adapted for increasing a hydrophobicity of the at least some pores.

17. The method recited in claim 16, wherein the channeled compound comprises at least one of humic acid, kerosene, turpentine, pinene, paraffin, hexadecane, and a C8-C16 saturated hydrocarbon.

18. A method for creating a water- and nutrient-delivery system for a plant comprising:
    joining lateral ends of a sheet comprising a hydrophilic material to form a tube having a lumen therethrough;
    positioning a delivery portion of the tube in a plant growth medium;
    planting a plant in the growth medium, a root system of the plant adjacent the tube delivery portion;
    positioning an inlet of the tube in fluid communication with a source of a solution; and
    regulating a pressure of the solution upstream of the tube inlet.

19. The method recited in claim 18, further comprising channeling a compound through the solution-channeling device lumen, the compound adapted for adsorption onto at least some pores of the solution-channeling device, the compound adapted for increasing a hydrophobicity of the at least some pores.

20. The method recited in claim 19, wherein the channeled compound comprises at least one of humic acid, kerosene, turpentine, pinene, paraffin, hexadecane, and a C8-C16 saturated hydrocarbon.

21. A method for creating a water- and nutrient-delivery system for a plant comprising:
introducing an alcohol solution of a hydrophilic polymer to a microporous hydrophobic sheet;
joining lateral ends of the sheet to form a tube;
positioning a delivery portion of the tube in a plant growth medium;
planting a plant in the growth medium, a root system of the plant adjacent the tube delivery portion;
introducing a solution into the tube lumen; and
regulating a pressure of the solution upstream of an inlet into the tube lumen.

22. The method recited in claim 21, wherein the polymer comprises polyhydroxystyrene.

23. The method recited in claim 21, further comprising channeling a compound through the tube lumen, the compound adapted for adsorption onto at least some pores of the solution-channeling device, the compound adapted for increasing a hydrophobicity of the at least some pores.

24. The method recited in claim 23, wherein the channeled compound comprises at least one of humic acid, kerosene, turpentine, pinene, paraffin, hexadecane, and a C8-C16 saturated hydrocarbon.

25. A method for creating a water- and nutrient-delivery system for a plant comprising:
making a tube hydrophilic, the tube having a lumen therethrough and comprising a microporous polyethylene material comprising fine, high-density polyethylene fibers;
positioning a delivery portion of the tube in a plant growth medium;
planting a plant in the growth medium, a root system of the plant adjacent the tube delivery portion;
introducing a solution into the tube lumen via an inlet thereinto; and
regulating a pressure of the solution upstream of the tube inlet.

26. The method recited in claim 25, wherein the hydrophilic-making step comprises introducing a hydrophilic polymer to at least one surface of the tube.

27. The method recited in claim 25, wherein the polymer comprises polyhydroxystyrene.

28. The method recited in claim 25, further comprising channeling a compound through the solution-channeling device lumen, the compound adapted for adsorption onto at least some pores of the solution-channeling device, the compound adapted for increasing a hydrophobicity of the at least some pores.

29. The method recited in claim 28, wherein the channeled compound comprises at least one of humic acid, kerosene, turpentine, pinene, paraffin, hexadecane, and a C8-C16 saturated hydrocarbon.

30. A method for providing a nurturing solution to a plant comprising:
creating a substantially planar, microporous film comprising a hydrophilic polymer;
joining opposed sides of the film to form a tube having a lumen therethrough;
positioning a delivery portion of the tube in a plant growth medium;
planting a plant in the growth medium, a root system of the plant adjacent the tube delivery portion;
introducing a solution into the tube lumen; and
regulating a pressure of the solution upstream of an inlet into the tube lumen.

31. The method recited in claim 30, wherein the film comprises a hydrophobic-hydrophilic polymer blend, the blend formed into the tube.

32. The method recited in claim 30, further comprising blending the hydrophilic polymer with a hydrophobic polymer prior to the creating step.

33. The method recited in claim 30, wherein the creating step comprises bonding the hydrophilic polymer to a surface of a hydrophobic substrate.

34. The method recited in claim 33, wherein the bonding comprises performing photo-chemical immobilization.

* * * * *